United States Patent [19]

Yamashita et al.

[11] 4,349,524
[45] Sep. 14, 1982

[54] PROCESS FOR PRODUCING PURIFIED HYDROCHLORIC ACID

[75] Inventors: Yoshisato Yamashita; Yutaka Matsuo, both of Minamatashi, Japan

[73] Assignee: Chisso Corporation, Osaka, Japan

[21] Appl. No.: 256,242

[22] Filed: Apr. 21, 1981

[30] Foreign Application Priority Data

Feb. 20, 1980 [JP] Japan .................................. 55-19928

[51] Int. Cl.³ ............................................. C01B 7/07
[52] U.S. Cl. ..................................... 423/488; 423/482
[58] Field of Search ....................... 423/481, 482, 488

[56] References Cited

U.S. PATENT DOCUMENTS

| | | | |
|---|---|---|---|
| 1,398,224 | 11/1921 | Fredriksson | 423/481 |
| 2,220,570 | 11/1940 | Hurt | 423/482 |
| 2,475,752 | 7/1949 | Nachod et al. | 423/482 |

Primary Examiner—Earl C. Thomas
Attorney, Agent, or Firm—Wenderoth, Lind & Ponack

[57] ABSTRACT

A process for producing a purified hydrochloric acid from hydrogen chloride gas generated by reacting an alkali chloride with sulfuric acid is provided, which process comprises washing the hydrogen chloride gas with a hydrochloric acid having a saturation concentration and having the resulting gas absorbed in water.

This process does not require such a particular purification step as redistillation or reabsorption.

4 Claims, 1 Drawing Figure

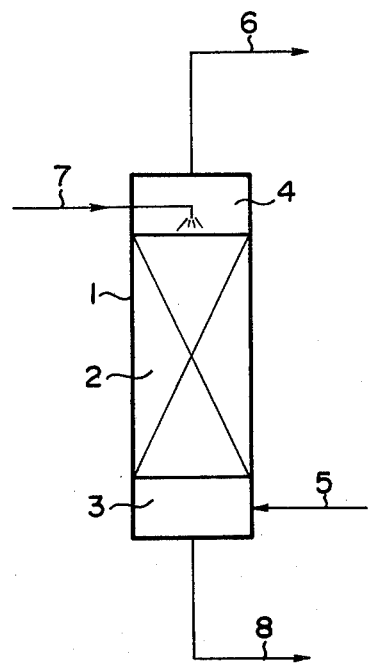

4,349,524

PROCESS FOR PRODUCING PURIFIED HYDROCHLORIC ACID

BACKGROUND OF THE INVENTION

1. Field of the Invention

This invention relates to a process for producing purified hydrochloric acid, and more particularly it relates to a process for producing concentrated hydrochloric acid having little impurities from hydrogen chloride gas generated by reacting an alkali chloride with sulfuric acid.

2. Description of the Prior Art

A process of reacting an alkali chloride with sulfuric acid to generate hydrogen chloride which is then caused to be absorbed into water to produce hydrochloric acid (which process will be hereinafter referred to as "conversion process"), is a technique being reevaluated in these days when energy-savings are desired. This is the case since such a large amount of electric power is not consumed as in the case of an electrolysis process of alkali chlorides; hydrogen chloride, not chlorine, can be directly obtained; and at the same time, useful alkali sulfates can be obtained.

However, in the case of hydrochloric acid obtained according to the conversion process wherein an alkali chloride and sulfuric acid are present as raw materials, impurities contained therein, e.g., an alkali sulfate formed at the reaction time of the conversion process, etc., mix in the hydrogen chloride generated in the form of dust or mist. Thus, hydrochloric acid produced by absorption of such hydrogen chloride in water is more impure than hydrochloric acid from hydrogen chloride obtained by reacting chlorine with hydrogen, and purification by redistillation or reabsorption has been required even for chemical industry uses.

In view of such a situation with hydrochloric acid produced according to the conversion process (which will be hereinafter referred to as "conversion process-hydrochloric acid"), the present inventors have studied a purification process wherein impurities present at the time of the conversion reaction do not mix in the conversion process-hydrochloric acid, and as a result have found that dust of potassium sulfate, etc. and mist of sulfuric acid (which will often be hereinafter referred to as "sulfuric acid mist, etc.") can be fully removed by washing the hydrogen chloride generated by reacting an alkali chloride with sulfuric acid, with hydrochloric acid having a saturation concentration.

As apparent from the foregoing description, an object of the present invention is to provide a process for producing purified, conversion process-hydrochloric acid without the need of any particular purification step such as redistillation or reabsorption.

Another object of the present invention is to provide purified hydrochloric acid produced according to the above process.

SUMMARY OF THE INVENTION

The present invention resides in the following processes (1) to (5):

(1) A process for producing purified hydrochloric acid which comprises washing hydrogen chloride gas generated by reacting an alkali chloride with sulfuric acid, with hydrochloric acid having a saturation concentration, and having the resulting gas absorbed in water.

(2) A process according to the process (1) wherein the alkali chloride is sodium chloride or potassium chloride.

(3) A process according to the process (1) or (2) wherein the hydrochloric acid having a saturation concentration contains 1 to 5% by weight of an alkali sulfate therein.

(4) A process according to any one of the processes to (1) (3) wherein the temperature of hydrogen chloride gas at the time of the washing is in the range of room temperature to 100° C. and the temperature of the hydrochloric acid having a saturation concentration is in the range of room temperature to 50° C.

(5) A process according to any one of the processes (1) to (4) wherein the hydrogen chloride gas prior to the washing is washed with sulfuric acid and the resulting gas is cooled down to a temperature in the range of room temperature to 100° C.

BRIEF DESCRIPTION OF THE DRAWING

The drawing shows a schematic view of a hydrogen chloride gas-washing apparatus employed in the present invention.

DETAILED DESCRIPTION OF THE PREFERRED EMBODIMENTS

The constitution and effectiveness of the present invention will be described below in more details.

(i) The hydrogen chloride gas employed in the present invention (abbreviated merely to "hydrogen chloride gas") is obtained by reacting an alkali chloride with sulfuric acid. This reaction may be either the so-called dry process wherein an alkali chloride is reacted with sulfuric acid in the form of solid or the so-called wet process wherein sulfuric acid is reacted with an aqueous solution of an alkali chloride. In the case of the wet process, however, since the resulting hydrogen chloride is present in solution in the original aqueous solution of an alkali chloride, it is necessary to separate the hydrogen chloride gas by way of a separate distillation or the like, which adds a necessary preliminary step.

In the case of the dry process, it is difficult to obtain 100% hydrogen chloride gas and 30 to 60% by volume of air, steam, etc. mix therein, but it does not matter in the practice of the present invention.

In the case of the wet process, the amount of impurities (sulfuric acid, alkali sulfate) to be removed according to the process of the present invention, contained in the hydrogen chloride gas generated by distillation, is far smaller than that in the case of the dry process, but it is possible to purify such hydrogen chloride gas according to the process of the present invention.

In the case of either of the processes, the main impurities in the form of solid or liquid are sulfuric acid, alkali sulfates and iron matter. Moisture, air, etc. which are present naturally do not constitute impurities since the objective product is hydrochloric acid.

The concentration of these impurities in the case of hydrogen chloride gas according to the dry conversion process is about 10 to 500 ppm in terms of sulfuric acid ($H_2SO_4$), about 0.5 to 50 ppm in term of an alkali sulfate and about 0.5 to 20 ppm in terms of iron matter (Fe), and when this hydrogen chloride gas is absorbed in water or dilute hydrochloric acid to produce concentrated hydrochloric acid, for the most part they are transferred into the concentrated hydrochloric acid. Further, if a procedure of distilling this concentrated hydrochloric acid to generate hydrogen chloride and reusing about 20% dilute hydrochloric acid as a distillation residue, for absorbing the hydrogen chloride gas according to the dry conversion process is repeated, sulfuric acid, alkali sulfate and iron matter as impurities accumulate in the dilute hydrochloric acid to reduce its absorbing capacity. Thus, in the process of the present invention, washing of hydrogen chloride gas according to the conversion process with concentrated hydrochloric acid, as described below in item (ii), is carried out for producing purified hydrochloric acid.

(ii) For the hydrochloric acid having a saturation concentration employed in the present invention (which will hereinafter be referred to as "washing hydrochloric acid"), one prepared by having pure hydrogen chloride absorbed in pure water is not required, but one prepared by having hydrogen chloride according to the conversion process absorbed in water (raw material water for uses of chemical industry or deionized water) so as to saturate the water therewith may be sufficient. Further, its concentration is not necessary to be a concentration of strictly 35% by weight or higher prior to its use, but it may be a suitable concentration (e.g. 20 to 32% by weight) taking into account concentration elevation or saturation due to absorption of hydrogen chloride gas during its use. However, the concentration, of course, must have reached its saturation concentration at a suitable stage after the initiation of the process of the present invention, since otherwise the yield of hydrogen chloride gas after washing will be reduced.

Further, the washing hydrochloric acid comes to contain small amounts of sulfuric acid, alkali sulfate and iron matter as a result of absorbing the impurities contained in the gas to be treated, during its use. Their allowable concentrations have no clear limitation, respectively, but that of $H_2SO_4$ may be 0 to 10% by weight, that of alkali sulfate, 0 to 10% by weight and that of iron matter, 0 to 1,000 ppm. If the concentration of $H_2SO_4$ or alkali sulfate exceeds 10% by weight or that of iron matter exceeds 1,000 ppm, there occurs a fear that mist or dust newly generated at the time of washing with the washing hydrochloric acid contrarily elevates the concentration of impurities contained in the hydrogen chloride gas after washing. An extraordinary fact as to the above-mentioned allowable concentrations is that the percentage impurities-removal in the case where the concentration of alkali sulfate in the washing hydrochloric acid is 1 to 5% by weight among the above range of 0 to 10% by weight is better than that in the case where the concentration is lower than 1% by weight or exceeds 5% by weight (see Example described later). The reason is not clear, but the above-mentioned fact is considered to be related to the physical properties of the boundary film formed in the contact dissolution of alkali sulfate (solid dust) with the washing solution.

(iii) Washing conditions in the process of the present invention: These are divided into (a) washing type and ratio of amounts of gas to liquid, (b) temperature and pressure and (c) others. The washing type (a) is not limited and may be either one of counterflow or parallel flow contact manner or gas blowing-in-liquid manner, but, in view of the object of removing a trace of impurities contained in a large amount of gas therefrom, a contact manner in which the contact area of gas with liquid is maximized and saving of power comsumption is possible (e.g. use of packed column) is desired. The ratio of amounts of gas to liquid (ratio by volume) is in the range of 10 to 1,000, preferably 50 to 500 in terms of the ratio by volume of the amount to be treated, to the treating amount, i.e. the amount of generated hydrogen chloride gas used ($Nm^3/hr$) to that of washing solution used ($m^3/hr$), and is varied depending on the apparatus employed. Further, in the case of the gas blowing-in-liquid manner, since it is unnecessary to circulate the washing solution, the amount of the washing solution must be increased to a higher one e.g. 1 to 100 in terms of the ratio of amounts of gas to liquid, than that in the case of the counterflow (or parallel flow) contact manner. Next, as to the temperature (b), the temperature of hydrogen chloride gas is not necessarily to be the same as that of the washing solution. The temperature of the hydrogen chloride gas obtained according to the dry process is often such a temperature as 50° to 100° C., even when cooling after its generation is taken into account, while in the process of the present invention, the washing can be adequately carried out if the temperature of the hydrogen chloride gas at the time of its feed is in the range of room temperature to 100° C. As for the temperature of the hydrogen chloride gas for the hydrochloric acid according to the dry process conversion, since the temperature inside the conversion furnace is as high as 350° to 400° C., the hydrogen chloride gas maintains a still high temperature of e.g. 150° to 250° C., even after leaving the conversion furnace. Although the gas may be indirectly cooled by water, the surface of the heat transfer wall of the heat-exchanger is liable to be contaminated by sulfuric acid mist, etc. to reduce the heat transfer coefficient to a large extent in such a short period as 10 days to one month. Thus, when the hydrogen chloride gas is washed with 60 to 80% by weight sulfuric acid at room temperature to 80° C. to cool its temperature down to 100° C. or lower, it is possible to cool it with ease and certainty, and as for the gas liquid contact conditions excluding temperature condition, those in the case where hydrogen chloride gas is washed with hydrochloric acid having a saturation concentration according to the process of the present invention can be applied. By employing this cooling manner, the concentration of sulfuric acid or alkali sulfate in the hydrogen chloride gas after cooling does not increase. On the other hand, the temperature of the hydrochloric acid having a saturation concentration as a washing solution may be in the range of room temperature to 50° C., and if the temperature exceeds 50° C. to a large extent due to the washing of the hydrogen chloride gas, the hydrochloric acid may be separately cooled during its circulation. Further, although the pressure (b) of the hydrogen chloride gas to be subjected to the washing treatment is not limited, about 10 to 100 mmHg/G may be sufficient, taking into account the pressure loss in the washing apparatus. However, it may, of course, be washed under such a pressure as 1 $kg/cm^2G$.

(iv) Removal extent of impurities by washing:

By washing the hydrogen chloride gas as described above in item (ii) with hydrochloric acid having a saturation concentration under conditions as described above in item (iii), the respective impurities are removed as follows:

For example, the concentration of sulfuric acid is reduced from 200 ppm down to 0.3 ppm, that of alkali sulfate, from 10 ppm down to 0.1 ppm and that of iron matter, from 1 ppm down to 0.02 ppm. Thus, by having hydrogen chloride gas purified as above, absorbed in water, it is possible to easily produce a purified hydrochloric acid having e.g. a sulfuric acid concentration of 1 to 0.1 ppm, an alkali sulfate concentration of 0.3 to 0.1 ppm and an iron matter concentration of 0.1 to 0.02 ppm.

The following Examples will be illustrated referring to the accompanying drawing, but the present invention is not limited thereby.

EXAMPLE 1

As shown in the drawing, a saturated hydrochloric acid is sprayed into a chamber. The saturated hydrochloric acid is sprayed, in a packed column 1 having a packed part 2 of 300 m in diameter and 3 m in height, through a saturated hydrochloric acid-circulating piping 9, a pump 7 and additional circulating piping 9, from a saturated hydrochloric acid tank 6. The sprayed hydrochloric acid flows down through the inside of the packed part 2 under almost uniform diffusion therein and circulates into the saturated hydrochloric acid tank 6 through a chamber 3 into which hydrogen chloride is introduced. From the chamber 3 the saturated hydrochloric acid flows through the above circulating pipe 9. In the process 20 $Nm^3/hr$ of a conversion process-hydrogen chloride gas at 50° C. is introduced into the chamber 3 of the column through a hydrogen chloride-introducing pipe 8. The concentration composition of the above saturated hydrochloric acid is 35% of HCl, 3% of $H_2SO_4$ and 1% of $K_2SO_4$ (each % by weight); its circulating amount is 300 kg/hr; and its liquid temperature is 50° C. On the other hand, the composition of hydrogen chloride gas fed is 40% by volume of hydrogen chloride and the remainder consisting of air as main part and trace of impurities comprising those shown in Table 1 mentioned later. The hydrogen chloride gas introduced as mentioned above ascends through the packed part 2 inside the packed column 1 while it is washed with the saturated hydrochloric acid, passes through the saturated hydrochloric acid-spraying chamber 4 and a mist separator 5, and reaches an exit pipe 10 for the washed hydrogen chloride gas, after which the gas is absorbed by water in a known hydrogen chloride-absorbing column to produce purified, concentrated hydrochloric acid. If necessary, the gas is passed through a mist-separating valve 11 fitted to the gas exit pipe 10 and any remaining mist is removed by a second mist-separator (not shown). The respective amounts of impurities contained in the hydrogen chloride gas before the washing and that after the washing, according to the above practice, are shown in the following Table 1. The sampling of the above gases are carried out through a valve 12 and a valve 11, respectively, and the samples are taken in analytical absorption bottles. The concentrations of impurities in Table 1 have been expressed based on the values of impurities contained in 35% by weight of hydrochloric acid.

TABLE 1

Concentrations of impurities before and after washing (I)

|  | Before washing | After washing |
|---|---|---|
| $H_2SO_4$ ppm | 151 | 0.24 |
| $K_2SO_4$ ppm | 4.5 | 0.05 |
| Fe ppm | 0.9 | 0.02 |

As apparent from the above Table, the respective concentrations of the above impurities are all notably reduced by the washing with saturated hydrochloric acid, of the process of the present invention, and the hydrochloric acid obtained by having the hydrogen chloride gas after washing absorbed in water has been purified with respect of these impurities, up to a sufficient extent for chemical industry use.

EXAMPLE 2

This example was carried out as in Example 1 employing the apparatus of the drawing except that a saturated hydrochloric acid containing 35% of HCl, 0.1% of $H_2SO_4$ and 0.1% $K_2SO_4$ (each % by weight) was employed. The results are shown in Table 2.

TABLE 2

Concentrations of impurities before and after washing (II)

|  | Before washing | After washing |
|---|---|---|
| $H_2SO_4$ ppm | 160 | 0.29 |
| $K_2SO_4$ ppm | 4.3 | 0.15 |
| Fe ppm | 0.7 | 0.02 |

As apparent from the above Table, the impurities-removing effectiveness with the washing is so notable that the hydrogen chloride gas has been purified up to a sufficient extent for use as hydrogen chloride gas for producing hydrochloric acid for chemical industry use.

However, since the concentration of potassium sulfate in the washing saturated hydrochloric acid is lower than that in Example 1, the $K_2SO_4$-removing effectiveness with the washing is somewhat inferior to that in Example 1.

What is claimed is:

1. A process for producing purified hydrochloric acid which comprises washing hydrogen chloride gas which is generated by reacting an alkali chloride with sulfuric acid, with hydrochloric acid having a saturation concentration, to remove sulfuric acid, alkali sulfates and iron matter contained in the gas, and then having the resulting gas absorbed in water.

2. A process according to claim 1 wherein the alkali chloride is sodium chloride or potassium chloride.

3. A process according to claim 1 wherein the hydrochloric acid having a saturation concentration contains 1 to 5% by weight of an alkali sulfate therein.

4. A process according to claim 1 wherein the temperature of hydrogen chloride gas at the time of the washing is in the range of room temperature at 100° C. and the temperature of the hydrochloric acid having a saturation concentration is in the range of room temperature to 50° C.

* * * * *